H. L. SCOTT.
RECORDING ATTACHMENT FOR TESTING MACHINES.
APPLICATION FILED APR. 3, 1917.

1,324,470.

Patented Dec. 9, 1919.
3 SHEETS—SHEET 1.

Witnesses
Eugene P. Reilly.
C. F. Macready.

Inventor
Henry L. Scott
By
Howard E. Barlow
Attorney

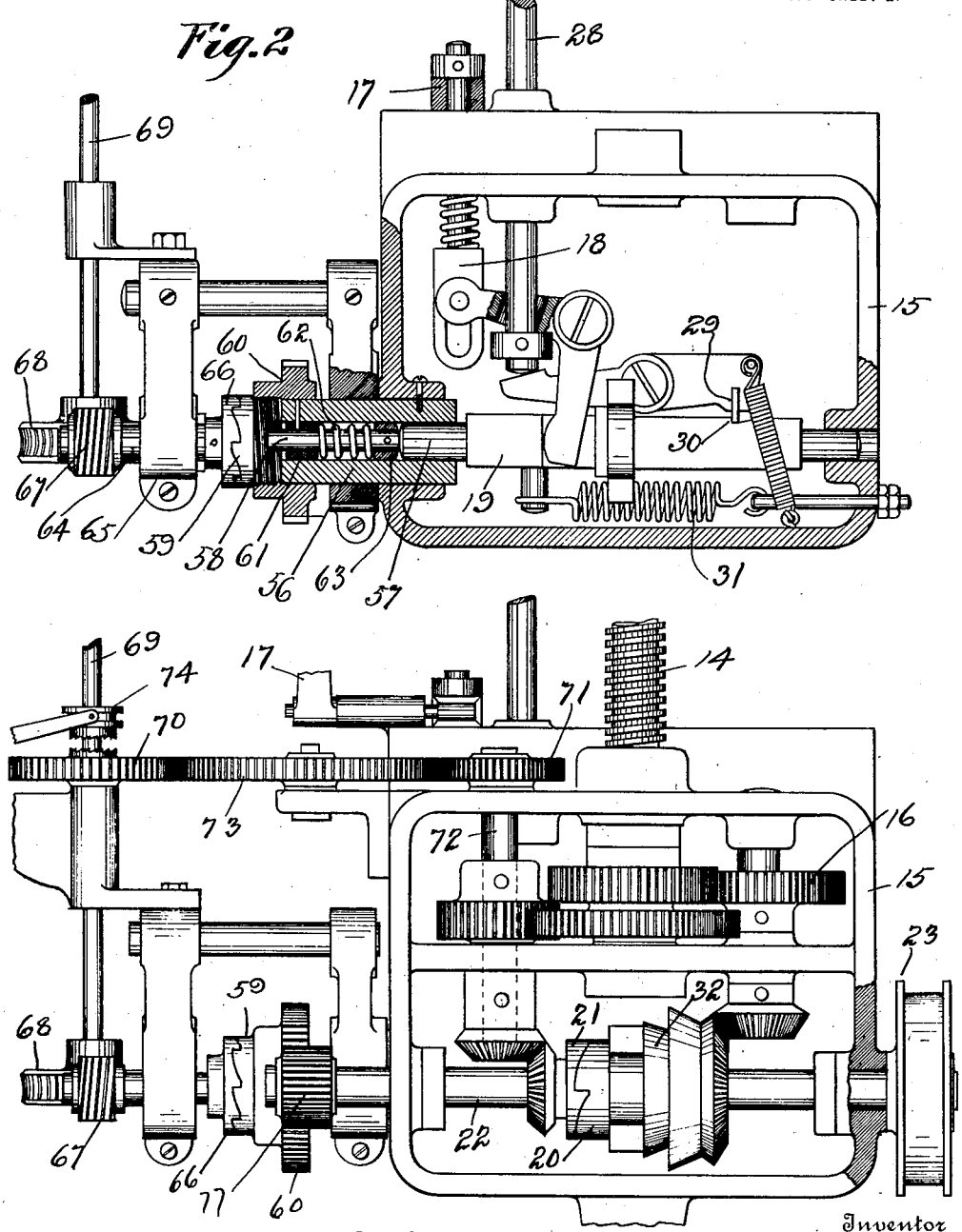

H. L. SCOTT.
RECORDING ATTACHMENT FOR TESTING MACHINES.
APPLICATION FILED APR. 3, 1917.

1,324,470.

Patented Dec. 9, 1919.
3 SHEETS—SHEET 3.

Witnesses
Eugene P. Reilly
A. F. Macready

Inventor
Henry L. Scott

By Howard E. Barlow
Attorney

UNITED STATES PATENT OFFICE.

HENRY L. SCOTT, OF PROVIDENCE, RHODE ISLAND.

RECORDING ATTACHMENT FOR TESTING-MACHINES.

1,324,470.      Specification of Letters Patent.      Patented Dec. 9, 1919.

Application filed April 3, 1917. Serial No. 159,525.

*To all whom it may concern:*

Be it known that I, HENRY L. SCOTT, a citizen of the United States, and resident of the city of Providence, in the county of Providence and State of Rhode Island, have invented certain new and useful Improvements in Recording Attachments for Testing-Machines, of which the following is a specification.

This invention relates to a recording attachment for testing machines, and has for its object to provide means for carrying a record sheet, said means being operatively mounted to work in connection with the testing machine together with a pen to record both the strength and stretch of the goods.

A further object of the invention is to provide the record sheet carrier in the form of a flat platen so that a sheet of the ordinary letter size may be carried flat upon the plate.

A still further object of the invention is to provide means whereby this plate may be moved vertically and to arrange a mechanism whereby it may be manually moved to its starting point and controlled in its feeding movement by the operation of the testing machine.

A still further object of the invention is to provide means whereby the plate may be driven positively both up and down by the action of the machine.

The invention further consists in the provision of means whereby the relative driving speed of the platen and the machine may be varied by changing the gear ratios.

With these and other objects in view, the invention consists of certain novel features of construction, as will be more fully described, and particularly pointed out in the appended claims.

Figure 1:
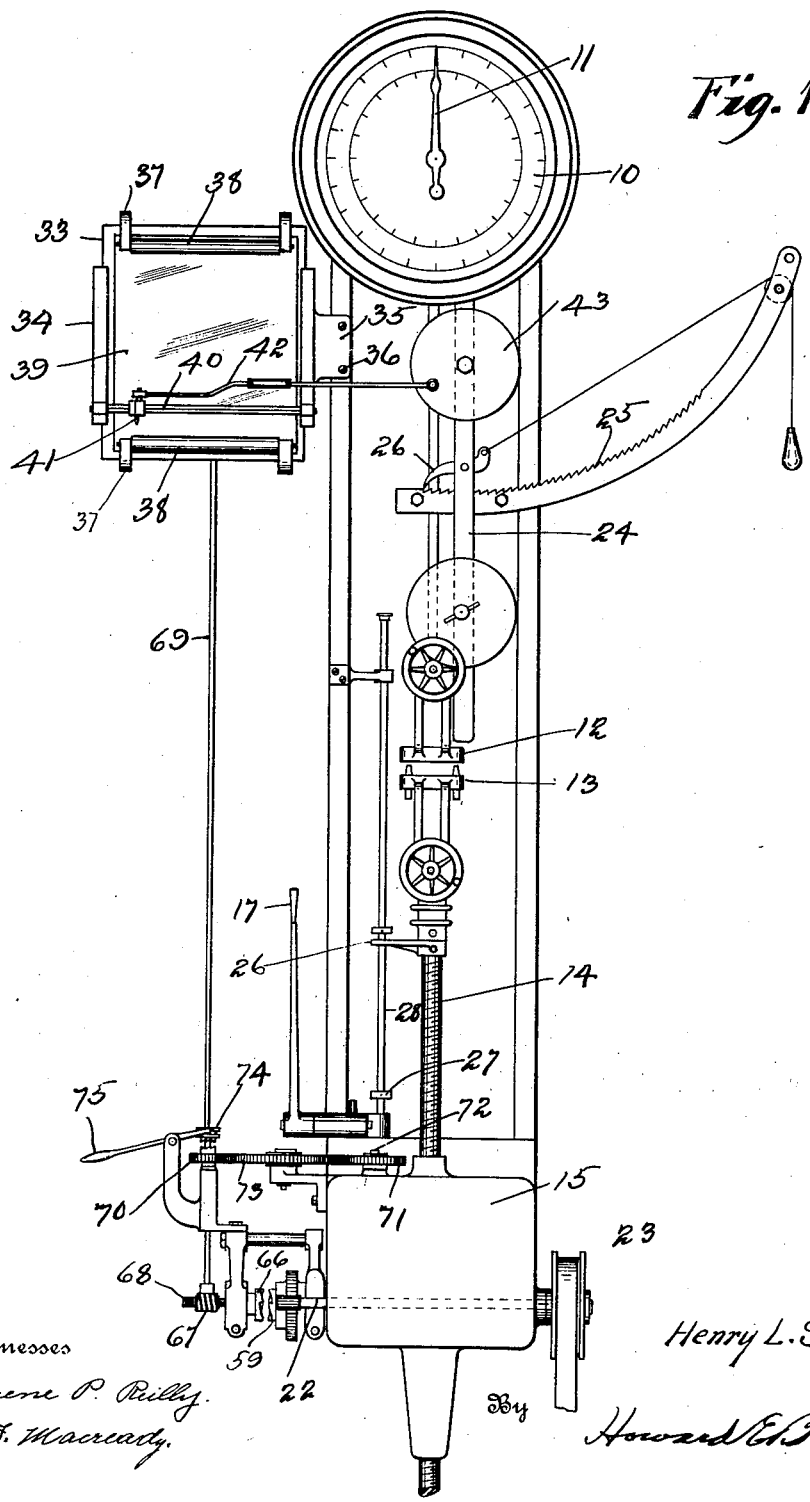

In the accompanying drawings:

Figure 1— is a front view showing a vertically arranged testing machine with my improved recording device attached thereto.

Fig. 2— is a front view of the gear casing partly in section with the gears removed and showing the starting and reversing mechanism with a part of the recording platen mechanism operatively connected thereto.

Fig. 3— is a front view of the gear casing with the gears mounted therein and showing the main shaft driving the platen operating mechanism.

Figure 4:
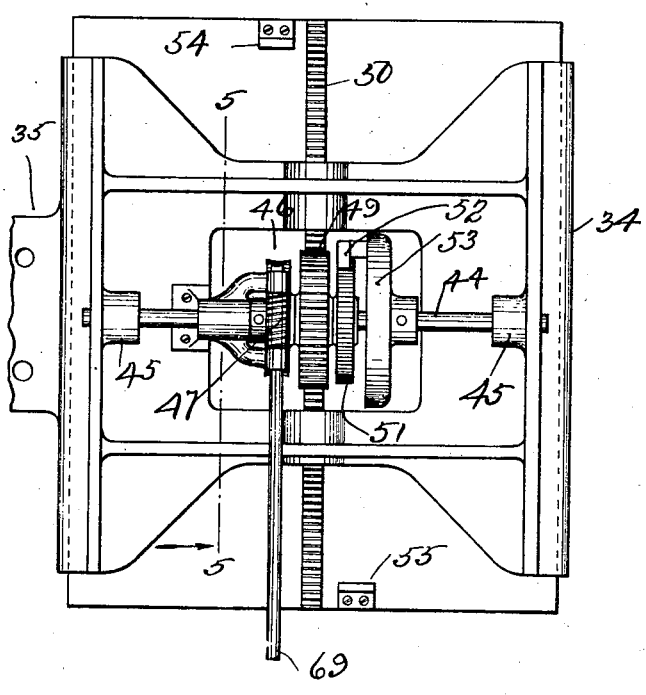

Fig. 4— is a rear view of the platen carrier frame with the platen mounted therein and showing the platen operating mechanism mounted therein.

Figure 5:
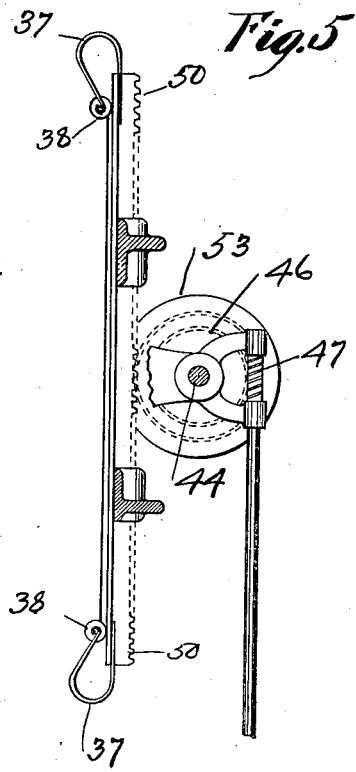

Fig. 5— is an edge view sectioned on line 5—5 of Fig. 4.

Figure 6:
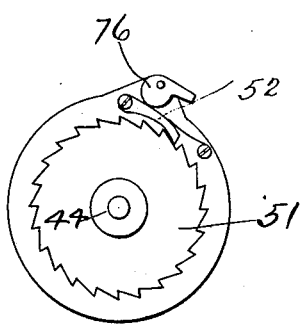

Fig. 6— is a detail showing the means for locking the pawl to the ratchet whereby the platen may be driven positively both up and down.

My improved recording mechanism may be used on any type of machine for testing the strength and stretch of a strip of fabric, rubber or other goods, but for convenience I have shown the same mounted to operate in conjunction with the vertical type machine. This machine is provided with a graduated dial 10 over which works the indicating hand 11 to show the tension applied to the goods through the clamps 12 and 13. The upper clamp is connected to the usual means (not shown) which moves the hand over the dial, the movement of which is resisted by the weighted pendulum 24. The lower jaw is connected to the tension screw 14 which extends down through the gear box 15 as shown in Fig. 3 and which is acted upon by a nut in the train of gears 16 in the manner illustrated and described in my Patent No. 1219594, dated March 20, 1917.

In this patent is also described the starting and stopping mechanism which comprises essentially the starting handle 17, see Fig. 1, by one movement of which the yoke 18 is raised to throw the bar 19 to the left and so move the toothed clutch 20 into engagement with its mate 21 to start the main shaft 22, which is driven through pulley 23 from motor (not shown).

The starting of this mechanism begins to draw downward the screw 14 and exert a tension on the goods, which tension swings outward the weighted pendulum arm, the pawl 26 engages the teeth 25 on the segment, to prevent a backward swing of the pendulum when the goods break. The continued downward motion of the screw causes the arm 26ª to engage the collar 27 on the rod 28, as shown in Figs. 1 and 2, thereby raising the lip 29 of the dog from engagement with the notch 30 on the bar 19 thus permitting the said bar under action of the spring 31 to move to the right, disengage the toothed clutch 20 and engage the friction clutch 32 reversing the action of the screw 14.

My improved recording device which is the essential feature of my present invention, is provided with a platen or flat plate 33 which is adapted to slide vertically in frame 34, which frame is secured to the frame of the machine, by means of screws 36 through the ear 35. This platen is provided with two spring arms 37 both at the top and bottom edges thereof, each pair being provided with end bearings to receive the rubber roll 38 by means of which the sheet of record paper 39 is removably secured to the platen.

Across the front face of this platen extends a square bar 40 on which is slidably mounted the pen or pencil 41. This pen is connected through the rod 42 to the weight 43 on the pendulum arm 24 whereby a swinging of this arm causes a traverse motion of the pen on the square bar 40.

On the back of this platen frame, see Fig. 4, is mounted a horizontal shaft 44 to rotate in bearings 45, which shaft is driven through worm gears 46, worm 47 and upright shaft 69 from mechanism presently described. This horizontal shaft has a gear 49 loosely mounted thereon and meshing with a vertically disposed rack 50 on the back of the platen, said rack gear being provided with a hub on which is fixed a ratchet toothed wheel 51. This ratchet wheel is engaged by a pawl 52 carried by the disk 53, said disk being secured to the shaft 44, by which construction it will be seen that the platen may be manually moved upward to its uppermost position by the operator and controlled in its downward movement by the action of the machine through the rotation of the worm and gear 46 and 47.

This platen is provided with stops 54 and 55 to limit the extent of its vertical motion.

In order to drive this platen in time with the tension mechanism, I have mounted a sleeve 56 in the casing 15 in one end of which slides the end 57 of bar 19, which bar is arranged to abut against the short shaft 58. To the outer end of this short shaft is connected the clutch 59 on which is mounted the gear 60. A collar 61 is mounted in and pinned to this sleeve 56 and a spring 62 is arranged to act between this collar 61 and a collar 63 which is pinned to this short shaft to hold the inner end of said short shaft against the end 57 of the bar 19.

A jack-shaft 64 is mounted to turn in the bearing 65 and is provided at one end with the second member 66 of the toothed clutch. The outer end of this jack-shaft is provided with a spiral gear 67 meshing with a second spiral gear 68 to which latter is connected the upright shaft 69 through which the platen mechanism above described is driven.

From the above it will be seen that when the operating handle 17 is moved in a direction to start the tension on screw 14 downward, the movement of the shift bar 19 throws the clutch member 59 which is driven from main shaft 22 through pinion 77 and gear 60 into the member 66 to rotate the upright shaft 69 and through it the worm and worm gear 47 and 46, thereby causing the platen to move downward of its own weight but controlled in its action by the action of this worm and gear 47 and 46.

In some cases as in the test for obtaining the stretching life of a strip of rubber, it is desired to cause the platen to be moved positively both up and down with the movement of the tension screw.

To accomplish this, I have mounted a gear 70 on the upright shaft 69 and gear 71 on the positively driven shaft 72, see Fig. 3, and connect the same through an intermediate gear 73. The gear 70 is provided with clutch teeth to engage the clutch 74 mounted to move on a feather key on the upright shaft 69, by means of the operating handle 75, so that when it is desired to drive the platen both up and down, it is only necessary to move the clutch 74 into engagement with that of the gear 70, which will cause the upright shaft 69 to be rotated in either direction and in time with the tension screw.

To prevent the pawl 52 from snapping back over its teeth, when driven in the reverse direction, I have provided a lock 76, see Fig. 6, which engages the pawl and holds it positively in engagement with its ratchet 51.

In some cases where the movement of the tension screw is very slight it is found desirable to increase the relative movement of the platen, which may be done by a simple changing of the ratio of the driving gears by any suitable means.

I have illustrated one means whereby my invention may be carried out but I do not wish to limit myself to this specific construction as various changes in the several features may be necessary. I therefore desire it to be understood that I reserve the privilege of resorting to all the mechanical changes to which the device is susceptible the invention being defined by the appended claims.

I claim:

1. In a testing machine the combination with means for applying tension to the goods, of a movable platen for carrying a record sheet, driving mechanism, means operated by said driving mechanism for controlling the movement of said platen, a recording pen, and means controlled by the tension-applying mechanism for moving said pen across the record sheet mounted in said platen.

2. In a testing machine the combination with a screw for applying tension to the goods, a weighted pendulum for resisting said tension applied by said screw, of a movable platen for carrying a record sheet, means connecting said screw and said platen whereby the platen is moved in accordance with the tension movement of said screw, and a recording pen connected to said pendulum whereby said pen is movable over said platen by the movement of the said pendulum.

3. In a testing machine the combination with a screw for applying tension to the goods, a weighted pendulum for resisting said tension, of a vertically movable platen for carrying a record sheet, a pawl and ratchet mechanism through which said platen may be manually moved in one direction, means for controlling the movement of said platen in the opposite direction in accordance with the tension movement of said screw. a recording pen, and means whereby said pen is moved in accordance with said pendulum.

4. In a testing machine the combination with means for applying tension to the goods, of a movable platen for carrying a record sheet, driving means for reciprocating said platen in accordance with the movement of the tension applying mechanism, a recording pen, and means for moving the pen across the sheet.

5. In a testing machine the combination with a screw for applying tension to the goods, gear driven means for operating said screw, of a movable platen for carrying a record sheet, means connected with said screw operating mechanism for actuating said platen in time with said screw during its tension stroke, a recording pen, and means for moving said pen across the record sheet.

6. In a testing machine the combination with a screw for applying tension to the goods, means for operating said screw, of a reciprocating platen for carrying a recording sheet, means connected with said screw operating means for controlling the recording movement of the platen during the tension stroke of said screw, means for arresting the action of the platen controlling mechanism when said screw reverses its travel, a recording pen, and means for moving said pen across the sheet.

7. In a testing machine the combination with a screw for applying tension to the goods, a weighted pendulum resisting said tension, of a movable platen for carrying the record sheet, means for operating said screw on its tension stroke and simultaneously operating said platen on its record stroke, means for automatically reversing the action of said screw and simultaneously arresting the action of said platen, and a record pen attached to said pendulum whereby the pen receives a traverse movement.

8. In a testing machine the combination with a screw for applying tension to the goods, gear driving means for operating said screw, a weighted pendulum for resisting the tension applied by said screw, of a reciprocating platen for carrying the record sheet, clutch mechanism through which the platen mechanism is driven with the tension stroke of the screw, said clutch being disconnected with the reverse action of said screw, and a record pen attached to said pendulum to be moved thereby across the face of the record sheet.

In testimony whereof I affix my signature in presence of a witness.

HENRY L. SCOTT.

Witness:
HOWARD E. BARLOW.